(12) United States Patent
Kim

(10) Patent No.: US 6,791,957 B2
(45) Date of Patent: Sep. 14, 2004

(54) APPARATUS AND METHOD FOR PROCESSING HANDOVER IN IMT-2000 SYSTEM

(75) Inventor: Sang-Ha Kim, Ichon-shi (KR)

(73) Assignee: Hyundai Electronics Industries, Kyoungki-do (KR)

( * ) Notice: Subject to any disclaimer, the term of this patent is extended or adjusted under 35 U.S.C. 154(b) by 754 days.

(21) Appl. No.: 09/741,083

(22) Filed: Dec. 27, 2000

(65) Prior Publication Data

US 2001/0006513 A1 Jul. 5, 2001

(30) Foreign Application Priority Data

Dec. 30, 1999 (KR) .................................... 1999-67497

(51) Int. Cl.⁷ .............................................. H04Q 7/00
(52) U.S. Cl. ..................................... 370/331; 455/437
(58) Field of Search ................................. 370/229, 230, 370/310, 310.1, 310.2, 328, 329, 331–4, 395.2, 400, 389, 431; 455/435–444

(56) References Cited

U.S. PATENT DOCUMENTS

| | | | |
|---|---|---|---|
| 6,005,852 A | 12/1999 | Kokko et al. | 370/329 |
| 6,069,885 A | 5/2000 | Fong et al. | 370/336 |
| 6,101,175 A | 8/2000 | Schorman et al. | 370/331 |

Primary Examiner—David Vincent
(74) Attorney, Agent, or Firm—Baker Botts LLP

(57) ABSTRACT

An apparatus and method for processing a seamless handover in IMT-2000 system. The apparatus includes: a unit for performing an interface with a base station controller and an analog subscriber interface for a test; a unit, having a structure of a non-blocking common memory, for switching an asynchronous transfer mode cell; and a unit for performing a trunk interface.

1 Claim, 6 Drawing Sheets

FIG. 5

| OCTET | FIELD | | | DESCRIPTION |
|---|---|---|---|---|
| | 7 | 4  3 | 0 | |
| 1-5 | HEADER | | | ATM HEADER |
| 6 | ID | | | PROTOCOL IDENTIFIER |
| 7 | MES_TYPE | | | MESSAGE TYPE |
| 8 | FLOW_ID | | | DATA FLOW IDENTIFIER |
| 9 | PR1 | QoS_MOD | | PRIORITY  QUALITY OF SERVICE MODIFIER |
| 10 | PFL | LOAD VALE | | EACH NODE LOAD(INPUT PACKET COUNTER) |
| 11-23 | S_BSA | | | SOURCE BASE STATION ADDRESS |
| 24-36 | T1_BSA | | | FIRST DESTINATION BASE STATION ADDRESS |
| 37-49 | T2_BSA | | | SECOND DESTINATION BASE STATION ADDRESS |
| 50 | N_D | | | NOT DEFINED |
| 51 | N_D | | | NOT DEFINED |
| 52 | N_D | CRC1 | | NOT DEFINED  FIRST PART OF THE CRC CODE |
| 53 | CRC2 | | | SECOND PART OF THE CRC CODE |

APPARATUS AND METHOD FOR PROCESSING HANDOVER IN IMT-2000 SYSTEM

FIELD OF THE INVENTION

The present invention relates to a mobile communication system; and, more particularly, to an apparatus and method for processing a handover in an international mobile telecommunication-2000 (IMT-2000) system.

PRIOR ART OF THE INVENTION

An international mobile telecommunication-2000 (IMT-2000) system is developed in order to provide mobility in a worldwide to a subscriber. In the IMT-2000 system, a terminal capable of transmitting various types of data, e.g., a voice signal, a data signal and a paging signal, multimedia and intelligent services are provided and security of personal information is guaranteed of by a personalization of service. The IMT-2000 system accommodates various kinds of terminals, e.g., a cellular phone and a car phone, and various kinds of services, e.g., a global mobile personal communication system (GMPCS), a public switched telephone network (PSTN) and an integrated services digital network (ISDN).

In order to increase an efficiency of limited frequency resources, the mobile communication system divides a whole of service area into small service areas, each of which is referred to a cell, and provides a service based on the cell. At this time, in order to guarantee a mobility of a subscriber, though a mobile station of the subscriber moves out from a service cell, a communication channel between the mobile station and the base station is handed over to another base station, which is referred to a handover. The handover means that a new communication channel is assigned to a mobile station by a base station in a cell to which the mobile station moves, when the mobile station communicating with another mobile station moves from a cell to another cell.

In general, the handover method is divided into two methods, a hard handover method and a soft handover method.

The hard handover method means that the communication channel between the mobile station and the base station communicating therewith is disconnected and then the new communication channel between the mobile station and the base station to be communicated therewith is connected. Using the hard handover, a communication disconnection can occur.

The soft handover method means that the new communication channel is connected before breaking the communication channel between the mobile station and the base station communicating therewith.

Requirements such as a threshold, a probability of a handover fail depend on a kind of telecommunication service. The handover should not fall down an efficiency of a network or a radio resource.

The handover can be performed for changing capabilities of a bearer or security codes necessary for an authentication. The hard handover gives an effect on not continuity or a quality of a service but a security degree; information for the handover should be minimized. The handover should be provided in various sizes of cells, for example, a pico cell, a micro cell, a macro cell and a mega cell.

FIG. 1 is a diagram illustrating a conventional method for processing a handover in the IMT-2000 system.

In the conventional handover method, a handover between mobile switching centers or a handover between networks can occur a serious problem.

Referring to FIG. 1, in a handover model based on a path re-routing method, an old base transceiver station (BTS) transmits a message having an identity of a new BTS to a node. The node searches to an optimum path between the old BTS and a target BTS. If there is the optimum path, the node is selected by a cross over switch, a setup message is generated and a new connection is set. However, if the cell is transmitted before the new path setup, a cell loss, which is a critical problem to a data communication, occurs. Accordingly, in the prior art, a cell buffering function block in the BTS or the MSC solves the above problem.

There are some problems in the conventional optimum handover as follows.

First, a connection setup delay varies depending on environments of a network because of characteristics of a connection-based asynchronous transfer mode (ATM). Accordingly, there is a problem in that it is difficult for a buffer to be enlarged enough. The enlargement of the buffer occurs to waste the resource. Also, the delay from buffering occurs to fall down the quality of a real-time based service.

Second, by using the same algorithm to both of a voice signal and a non-voice signal, the characteristic of the ATM is disregarded. For example, since the voice signal is less sensitive to a delay time, the delay time in the handover is not critical to the voice signal. However, since a high rate data signal is very sensitive to the processing time, the high rate data signal should be handed over within a short time.

Next, a re-routing path selected by the COS cannot be guaranteed as the optimum path, though a capability of accumulation in a quality of service is reduced by reducing a hopping count due to a path re-routing method based on a dynamic COS selection algorithm. It is difficult for a group handover due to the dynamic COS selection to be managed. Accordingly, a multimedia service, which is one of objects of the IMT-2000 service, cannot be provided easily.

As a result, when processing the handover between the MSCs, a variation of network loads becomes a critical obstacle in a rapid handover processing, a cell sequencing and a cell loss compensation.

SUMMARY OF THE INVENTION

Therefore, it is an object of the present invention to provide an apparatus and method for rapidly and efficiently processing a handover in an IMT-2000 system.

It is another object of the present invention to an apparatus and method for preventing a resource from being wasted when processing a handover.

In accordance with an aspect of the present invention, there is provided an apparatus for processing a handover in an international mobile telecommunication-2000 (IMT-2000) system, the apparatus comprising: means for performing an interface with a base station controller and an analog subscriber interface for a test; means, having a structure of a non-blocking common memory, for switching an asynchronous transfer mode cell; and means for performing a trunk interface.

BRIEF DESCRIPTION OF THE DRAWINGS

The above and other objects, features and advantages of the present invention will be more clearly understood from the following detailed description taken in conjunction with the accompanying drawings, in which:

FIG. 5 is a diagram illustrating information elements of a new MES cell; and

PREFERRED EMBODIMENTS OF THE INVENTION

Hereinafter, preferred embodiments of the present invention will be described in detail referring to the accompanying drawings.

Figure 1:
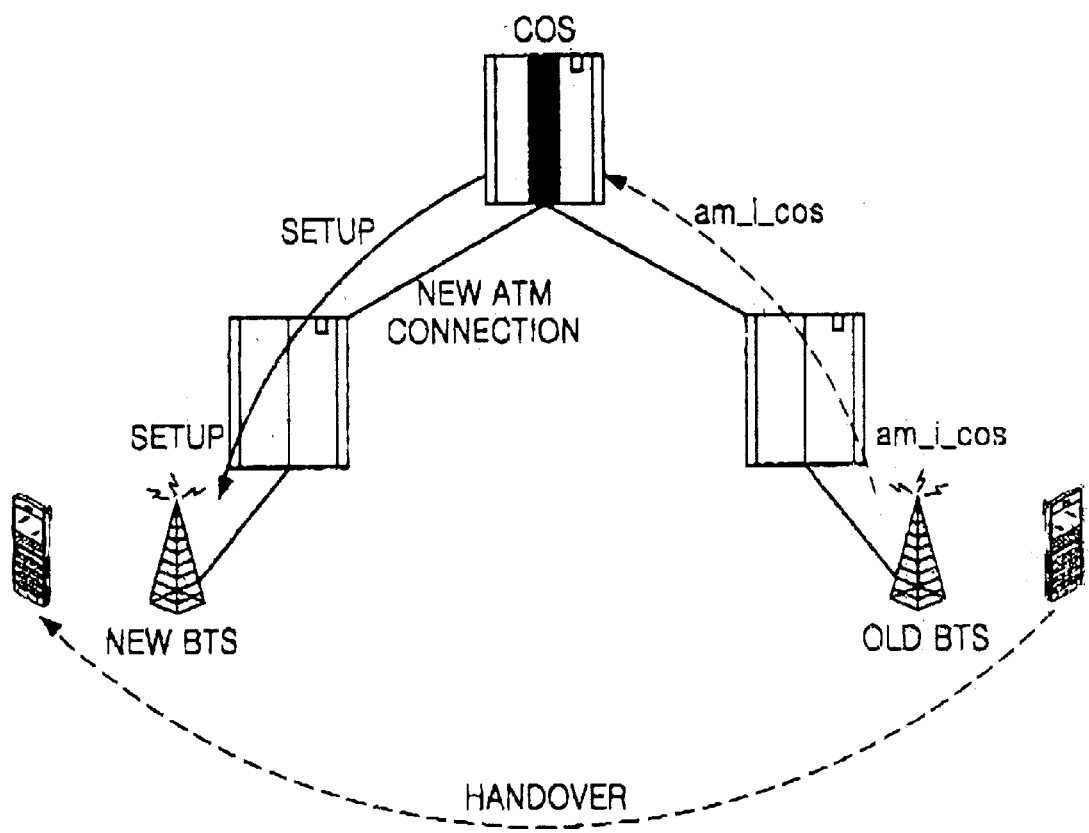
FIG. 1 is a diagram illustrating a conventional method for processing a handover in the IMT-2000 system.
Figure 2:
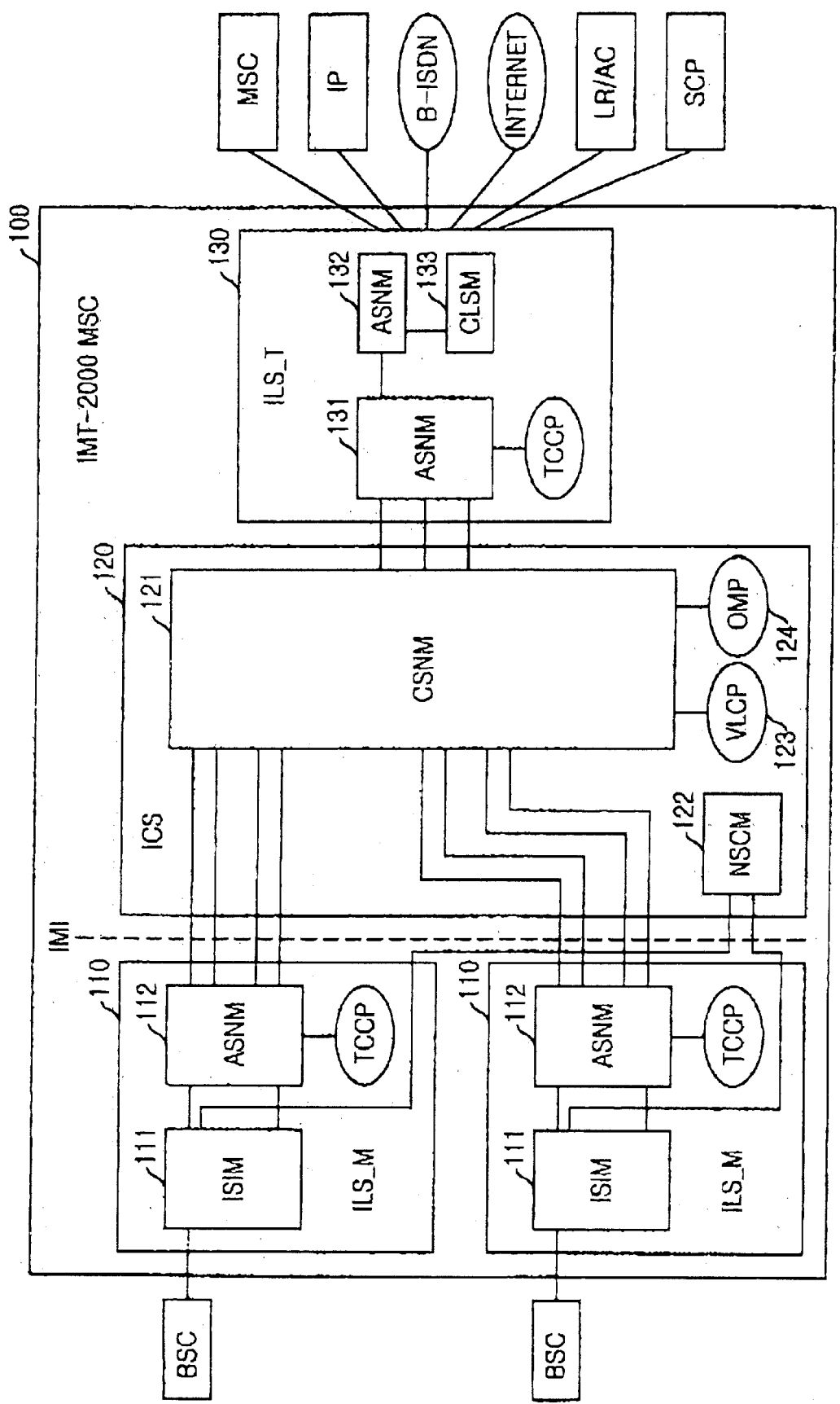
FIG. 2 is a block diagram of a handover processor in the IMT-2000 system in accordance with one embodiment of the present invention.

FIG. 2 is a block diagram of a handover processor in the IMT-2000 system in accordance with one embodiment of the present invention.

The handover processor 100 includes an IMT-2000 line subsystem mobility (ILS_M) 110, an IMT-2000 connection subsystem (ICS) 120 and an IMT-2000 line subsystem transit (ILS_T) 130.

The ILS_M 110 interfaces a base station controller (BSC) with the handover processor and performs an analog user interface for a test. The ILS_M 110 includes an IMT-2000 subsystem interface module (ISIM) 111 performing a STM-1 interface based on a synchronous digital hierarchy (SDH), and an access switch network module (ASNM) 112 performing an access switching of a network module.

The ISIM 111 detects input frames, updates routing information based on counts of the input frames, adds path selection information by extracting an ATM cell, changes a vertical path identifier/vertical channel identifier (VPI/VCI) of a cell header, transmits the changed VPI/VCI to a switch module and performs a multiplexing/demultiplexing for speed adjustment, a usage parameter control and an optical-to-electrical conversion.

The ICS 120, which is coupled to the ILS_M 110, includes a buffer and performs an exchange of an ATM cell having a structure of a non-blocking common memory. The ICS 120 includes a central switch network module (CSNM) 121, a network synchronization clock module (NSCM) 122 and a visitor location control protocol (VLCP). The CSNM 121 performs an inter-subsystem communication and an ATM cell change. The NSCM 122, which is coupled to the ILS_M 110, extracts a synchronous signal by performing a network synchronization, and generates a local clock in each subsystem. The VLCP 123, which is coupled to the CSNM 121 and the NSCM 122, performs a manufacturing automation protocol, an intelligent network application protocol and a terminal access control point protocol, and controls a visitor location register (VLR).

The ICS 120 demultiplexes input cell stream and performs buffering of the cell stream based on a type of traffic. According to the type of the traffic, the input traffic is processed by a different method as shown in FIG. 3.

Figure 3:
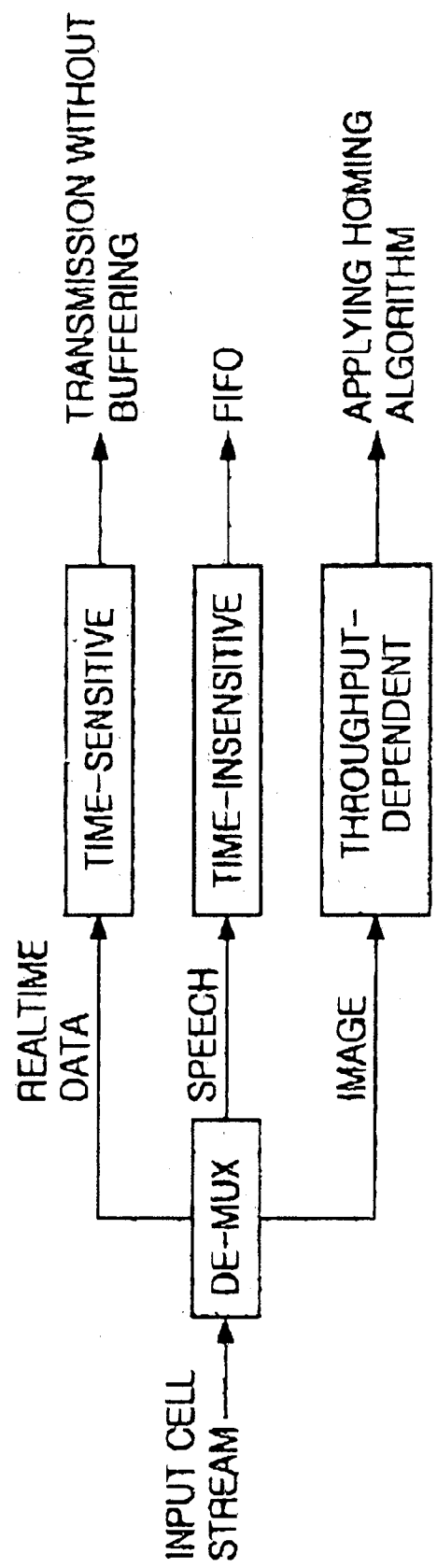
FIG. 3 is a diagram showing buffering according to characteristics of input traffic.

FIG. 3 is a diagram showing buffering according to characteristics of input traffic.

If the cell stream is real-time data signals, the buffering type of the cell stream is set as time sensitive class and the cell stream is directly transmitted without delay.

If the cell stream is voice signals, the buffering type of the cell stream is set as time insensitive class and the cell stream is buffered and transmitted in order of first input and first output (FIFO).

If the cell stream is video signals, the buffering type of the cell stream is set as throughput dependent class and the cell stream is transmitted based on Homming algorithm.

The ILS_T 130, which is coupled to ICS 120, includes an ASNM 131, a trunk bundle interface module (TBIM) 132 and a connectionless service module (CLSM) 133.

The ASNM 131 performs an access switching of the network module. The TBIM 132, which is coupled to the ASNM 131, performs a STM-1 matching and a STM-4 matching. The CLSM 133, which is coupled to the TBIM 132, performs functions of ATM adaptation layer 5 by using a connectionless service and transmits the result to a inter working function (IWF).

In the first generation telecommunication system, a voice signal and a data signal are transmitted by a circuit switching and by a packet switching, respectively. However, nowadays, the rule becomes to be broken, and this change is accelerated in the IMT-2000 system. In other words, for transmission of the voice signal, the packet switching is used. An amount of the voice communication is increased twice at every six years, on the contrary, an amount of the data communication is increased twice at every a hundred of days. The amount of the data communication leads that of the voice communication, and this trend becomes faster in the IMT-2000 system (which is referred to a third-generation communication) rather than in a personal communication system (PCS) (which is referred to a 2.5-generation communication). The amount of voice communication is a small part of an entire amount of communication, accordingly, the cost for processing the voice signal is much smaller than that for processing the data signal.

In nowadays, a cellular voice communication is focused in development of the IMT-2000 system, however, a ratio of the data communication will be increased. Therefore, a voice based handover model should be changed to a data based handover model. In other words, it is necessary for a new handover model focusing on the data communication to be introduced.

In order to solve the problems of the conventional IMT-2000 system, efficient handover processing methods are provided in the present invention.

In order to solve the first problem, a packet agent is used. The packet agent, which is located in a switch or in a base transceiver station, can check loads of the network in real time. A main function of the packet agent is a checking its load by counting packets inputted to the switch or the base station in the ATM layer through a packet capturing. By exchanging capturing results with neighboring nodes, the packet agent reduces buffering capacity through balance of entire network loads and processes the handover within a short time. The packet agent prevents overload of a signaling by using an inband signaling for exchanging a message with the neighboring nodes, provides an additional mobility to a conventional private network—network interface (PNNI) protocol. The packet agent can be easily embodied by inserting a new type of messages having an input packet counter as a parameter to a routing table. The packet agent can save a cost.

In order to solve the second and third problems, the input traffic is divided into three classes, a time sensitive class, a time insensitive class and a throughput dependent class, the input traffic is processed by a different buffering algorithm according to the class. The input cells are divided in the BTS or the MSC and processed according to the class. If the input cell is the time sensitive class traffic, the input cell is directly processed without delay. At this time, the input cell is processed by a fixed COS selection algorithm of an Anchor switching model in accordance with the conventional cellular communication system. The above algorithm can be applied to time dependent (TD) traffic which is sensitive to the data loss. At this time, it is difficult for a path optimization to be performed because of the use of the Homming algorithm. However, the sell sequencing is easy, the handover can be performed within a short time due to the simplicity of the algorithm.

If the input cell is the time insensitive class traffic, the input cell is buffered and transmitted through an optimum path by dynamical COS selection. In this case, there is problem in that a handover processing time is long. However, since the input cell is not sensitive to the delay, this algorithm is suitable for the time insensitive input cell. When processing the handoff, COS selection is performed according to a status of the current node through the packet agent, thereby being capable of efficiently selecting the COS. Each of the buffers has its priority, and the input cell is processed according to the priority of the buffer.

Figure 4:
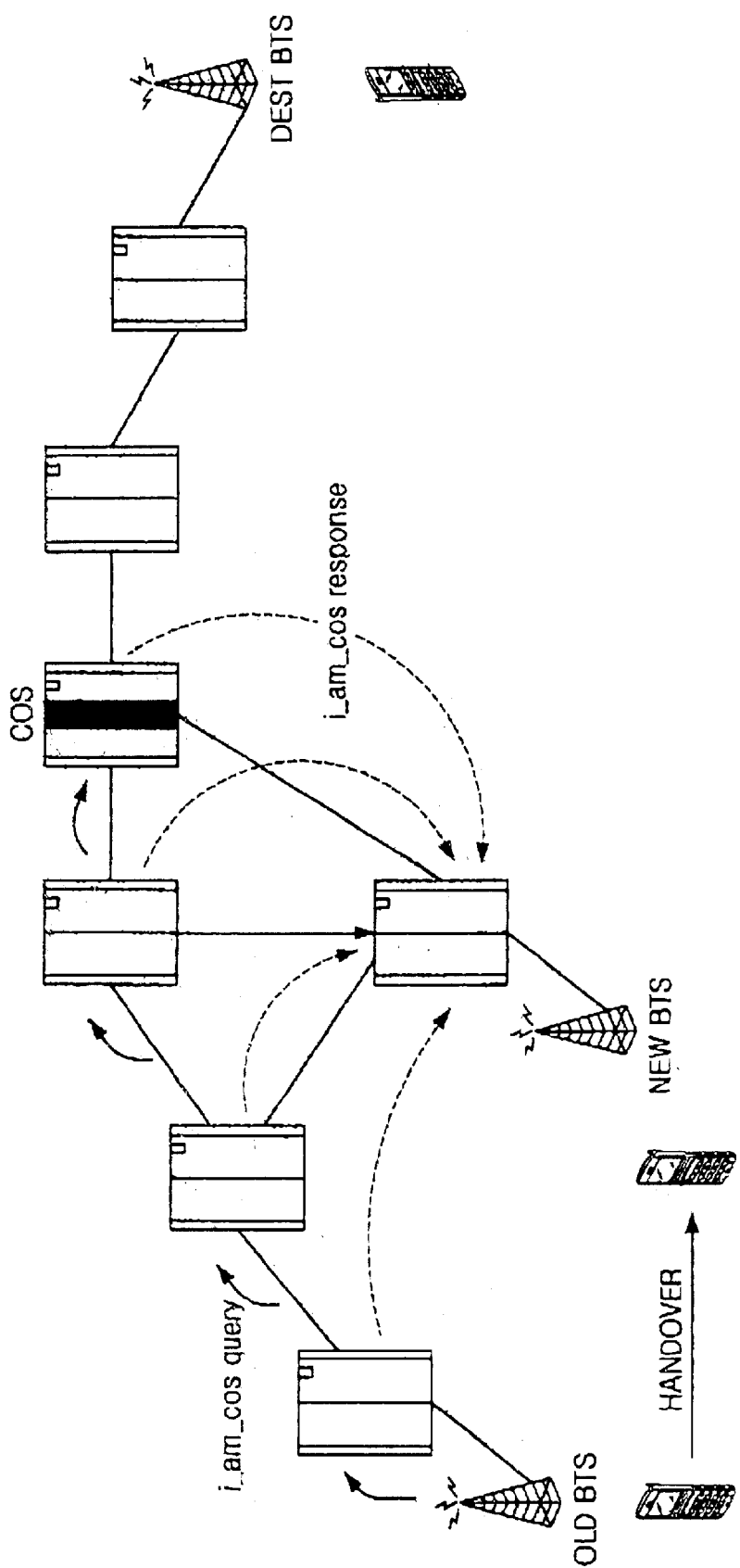
FIG. 4 is a diagram illustrating reverse dynamic selection processes and a routing table for an efficient COS selection.

FIG. 4 is a diagram illustrating reverse dynamic selection processes and a routing table for an efficient COS selection.

An old BTS starts to perform a cross over switch (COS) discovery. By checking the routing table of each node in reverse order, it is determined whether the node includes both of paths to the old BTS and the new BTS.

The connection is kept by a reverse handover, a seamless handover can be performed. On the contrary, in case of abnormal disconnection, the handover method cannot be used, it costs a lot of time to recover the connection through the old BTS, thereby generating a time delay. However, in case of the data communication, the seamless handover is more important than the time delay.

FIG. 5 is a diagram illustrating information elements of a new MES cell.

When performing the inband signaling, a new message is used. The new message reduces overload due to the inband signaling. On the contrary, for generating and analyzing the new message, there are some shortages in that the conventional ATM protocol recommendation should be modified and the MSCs can analyze the modified protocols.

The new cell inserted into data is referred to "a mobility enhancement signaling (MES)" and illustrated in FIG. 5. Since a pivot flag represents a wavelength of the MES cell, the length of the MES cell is limited.

Figure 6:
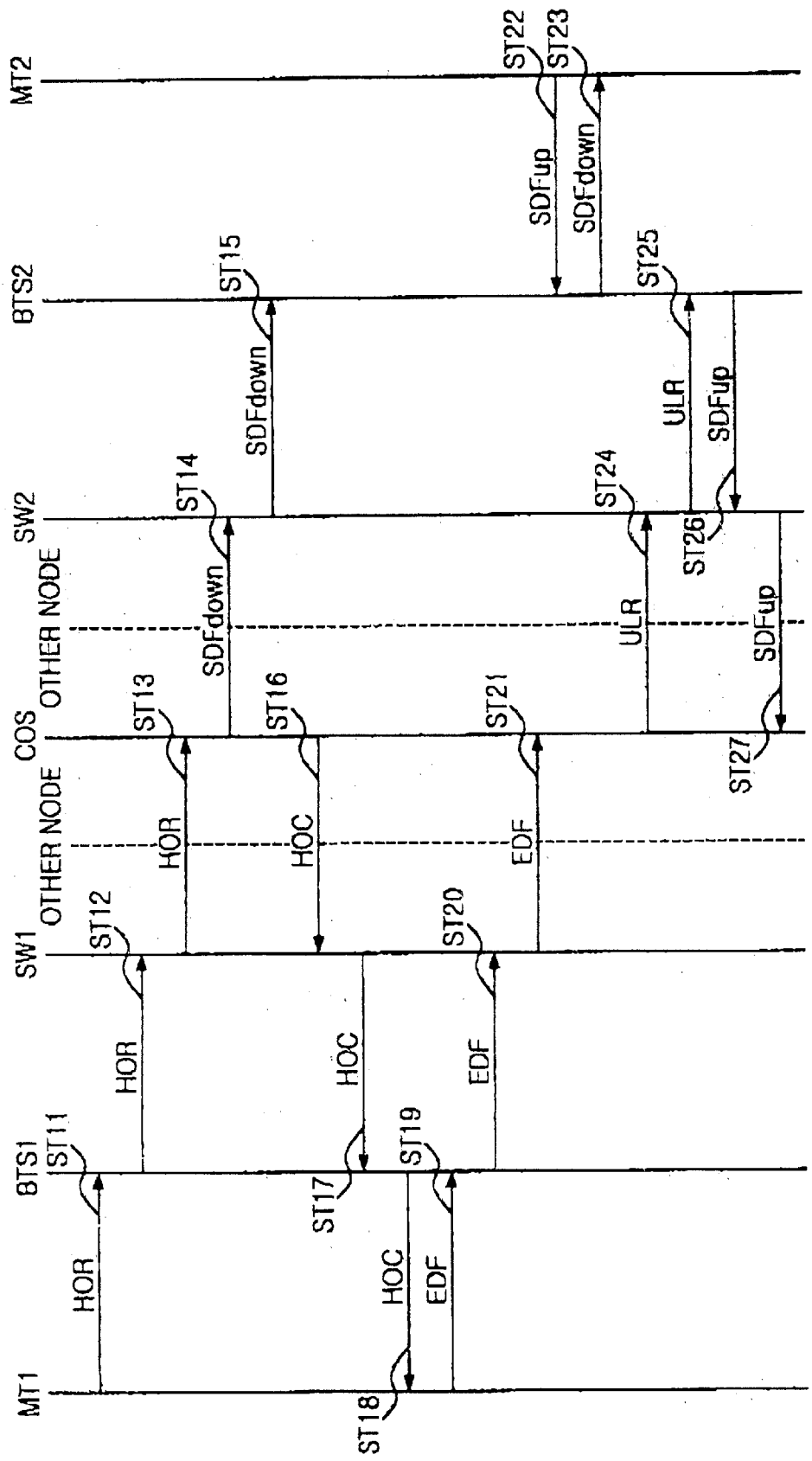
FIG. 6 is a flow chart illustrating a method for processing a handover in the IMT-2000 system in accordance with the present invention.

FIG. 6 is a flow chart illustrating a method for processing a handover in the IMT-2000 system in accordance with the present invention.

A network handover request (HOR) message is transmitted from a mobile station (MS) to a cross over switch (COS) through a base transceiver station (BTS) and a mobile switching center (MSC) at steps ST11 to ST13. The COS transmits a start data flow down (SDFdown) message to a new BTS through a new MSC at steps ST14 and ST15. Also, the COS transmits a handover confirm message informing that the network is prepared for a new switching to the MS through the MSC and the BTS at steps ST16 to ST18. The MS transmits an end data flow (EDF) message to the COS at steps ST 19 to ST21. The new BTS receives a start data flow up (SDFup) message from to the new MS and transmits a start data flow down (SDFdown) message to the new MS at steps ST22 and ST23. The new BTS receives an uplink ready (ULR) message from the COS and transmits an SDFup message to the COS at step ST24 to ST27.

When the amount of the data signals is much larger than that of the voice signals, in the present invention, an efficient and seamless handover is provided by rapidly selecting an optimum crossover switch, thereby preventing the waste of the resource.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for processing a handover in an international mobile telecommunication-2000 (IMT-2000) system, the method comprising the steps of:

a) at a mobile station, transmitting a network handover request message to a COS through a mobile switching center (MSC) and a base transceiver station (BTS);

b) at the COS, transmitting a message informing that the network is prepared for a new switching through the MSC and the BTS, and transmitting an MES cell by transmitting a new start data flow message informing a new BTS that a new data flow is started;

c) at the mobile station, transmitting a data flow complete message to the COS;

d) at the new BTS, transmitting the MES cell by receiving a start data flow message in a new uplink, by transmitting a start data flow message in a new downlink, by receiving an uplink ready message from the COS and transmitting a start data flow message in the new uplink.

* * * * *